(No Model.)
L. G. WOOLLEY.
SAFETY ATTACHMENT FOR DYNAMO ELECTRIC MACHINES.
No. 351,419. Patented Oct. 26, 1886.
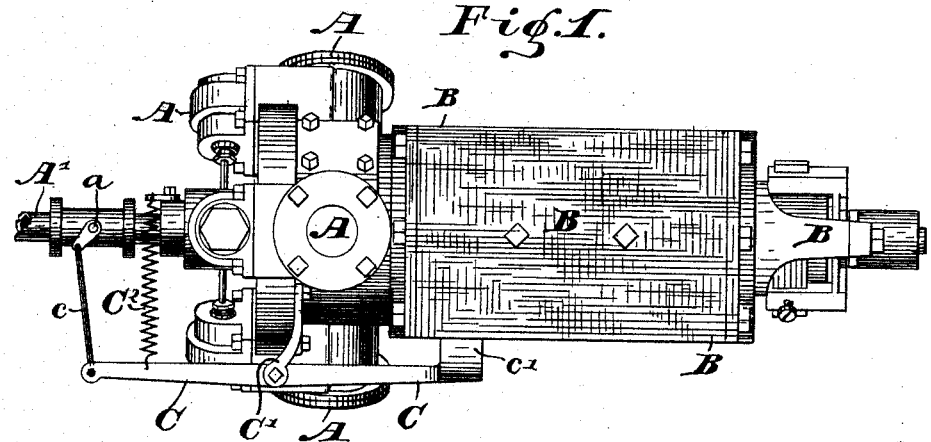
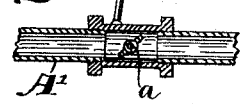
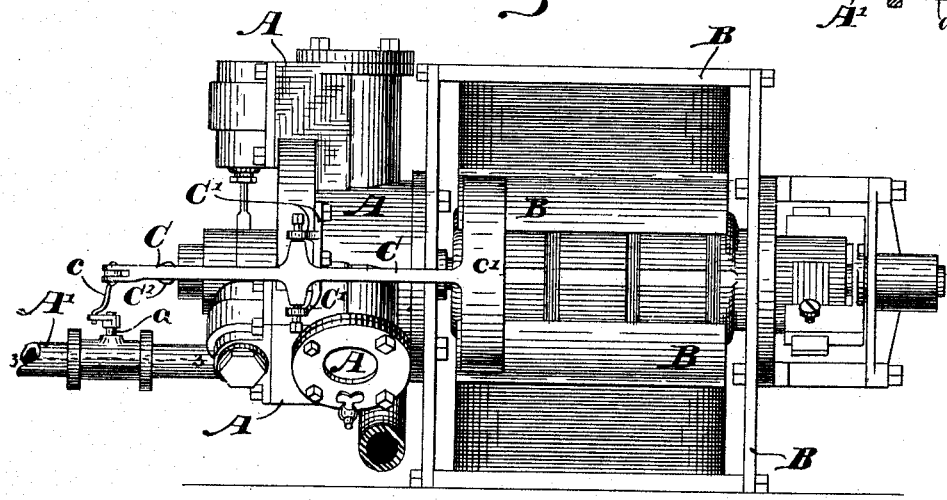
WITNESSES.
Cha. N. Leonard.
E. W. Bradford.
INVENTOR.
Leonidas G. Woolley,
PER
C. Bradford,
ATTORNEY.

UNITED STATES PATENT OFFICE.

LEONIDAS G. WOOLLEY, OF INDIANAPOLIS, INDIANA, ASSIGNOR TO HENRY H. McGAFFEY AND CHESTER BRADFORD, BOTH OF SAME PLACE.

SAFETY ATTACHMENT FOR DYNAMO-ELECTRIC MACHINES.

SPECIFICATION forming part of Letters Patent No. 351,419, dated October 26, 1886.

Application filed November 16, 1885. Serial No. 182,908. (No model.)

*To all whom it may concern:*

Be it known that I, LEONIDAS G. WOOLLEY, of the city of Indianapolis, county of Marion, and State of Indiana, have invented certain new and useful Improvements in Safety Attachments for Dynamo-Electric Machines, of which the following is a specification.

The object of my said invention is to produce a device whereby when the circuit of an electric lamp is broken the steam operating the engine for the dynamo will be shut off, and said engine and dynamo thus stopped. This object is accomplished by providing a valve in the inlet-pipe of the engine, connecting said valve to a pivoted bar, and providing on the other end of the bar an armature which may be brought into contact with a magnetized portion of the machine, and there held by the magnetic force resulting from the operation of said machine until the electrical circuit is broken and the magnetic power of the machine thus interrupted, when said device will be operated by a spring or other device operating reversely to the magnetic force to close the valve.

Referring to the accompanying drawings, which are made a part hereof, and on which similar letters of reference indicate similar parts, Figure 1 is a top or plan view of an engine and dynamo provided with my invention; Fig. 2, a side elevation of the same, and Fig. 3 a detail sectional view through the pipe and valve on the dotted line 3 3.

In said drawings, the portions marked A represent the engine; B, the dynamo, and C the pivoted bar.

The engine may be any suitable engine for the purpose. Its inlet-pipe A' has a suitable valve, $a$, located therein, which is connected by means of a connecting-rod, $c$, with the pivoted bar C. The variety of valve known as a "butterfly-valve" is shown, and is the preferable valve to use in this invention; but I do not limit myself to the particular form shown, but may use any valve which can be operated in this manner.

The dynamo B may be of any desired construction, and is not peculiar to this invention further than that it should be so arranged in relation to the engine that the armature can be brought into contact with its magnetized portion.

The bar C is mounted on pivots or pivot-bearings in a stud or arm, C', preferably attached to the engine or bed-plate at a suitable point, and is connected at one end to the valve $a$ by a connecting rod or link, $c$, and at the other end is provided with an armature, $c'$, as shown, which is adapted to come in contact with a magnetized portion and be there held, as will be presently described. A spring, $C^2$, or a weight is connected to this bar in such a manner as to operate reversely to the magnetic force, and thus when said force is interrupted and the armature released to close the valve.

The operation is as follows: When the machine is started up, the armature $c'$ is brought down into contact with the dynamo, and there held by the magnetic force which is generated during the operation of the machine. Should the electrical circuit become broken by the breaking of the lamp or other accident, the magnetic force would of course be interrupted, when the armature would be released from its influence, and the spring $C^2$ would operate to close the valve $a$ and shut off the steam, thus stopping the engine and obviating the disasters which would be otherwise liable to be consequent upon the accident.

Having thus fully described my said invention, what I claim as new, and desire to secure by Letters Patent, is—

1. The combination of a dynamo, an engine, its inlet-pipe, a valve located in said pipe, a pivoted bar connected with said valve at one end, and having an armature upon its other end, arranged to be operated upon by the field-magnet of the machine, as described, and a device operating reversely to the magnetic force which holds said armature against the dynamo, whereby when said force is interrupted said valve will be closed, substantially as set forth.

2. The combination of a dynamo, an engine, its steam-inlet pipe, a pivoted valve in said pipe, a crank-arm attached to the pivot of said valve, a bracket or standard, C', a bar, C, pivoted in said standard, an armature, $c'$, on one end of said bar, arranged to be operated by the field-magnets of the dynamo, a link or rod, c, on its other end, connected to the crank on the pivot of the valve, and a spring operating reversely to the magnetic force of the field-magnets on said bar, substantially as set forth.

In witness whereof I have hereunto set my hand and seal, at Indianapolis, Indiana, this 30th day of October, A. D. 1885.

LEONIDAS G. WOOLLEY. [L. S.]

In presence of—
 C. BRADFORD,
 CHARLES L. THURBER.